Figure 1:
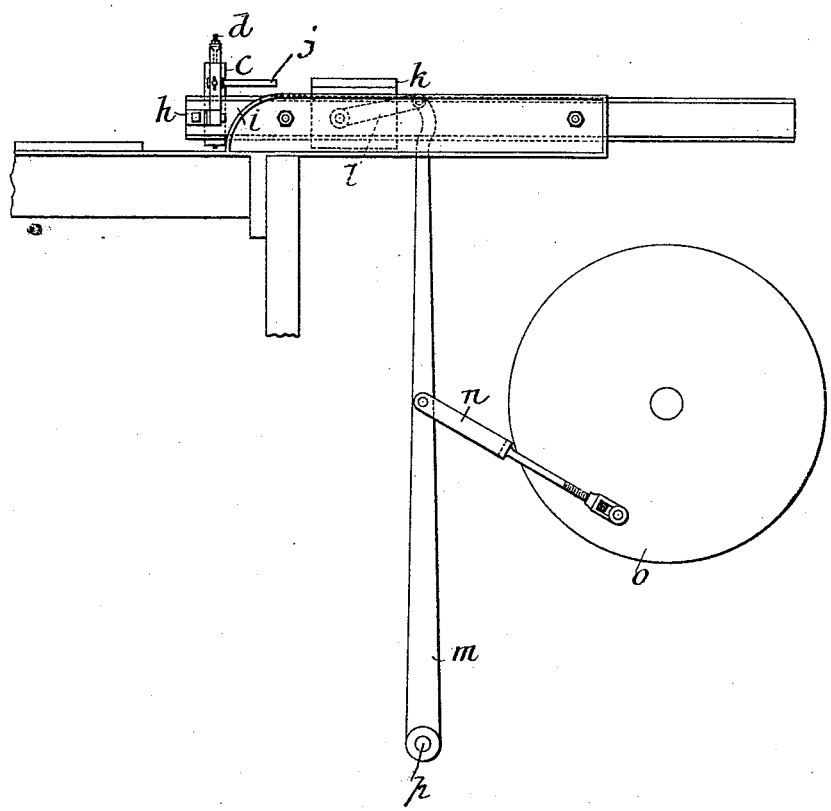

(No Model.) 5 Sheets—Sheet 1.

G. MARCHETTI & H. N. MELLOR.
METHOD OF AND MEANS FOR LUBRICATING THE WIRES IN LOOMS FOR WEAVING PILE FABRICS.

No. 483,073. Patented Sept. 20, 1892.

Witnesses.
Arthur H. Abell
John H. Snowden

Inventors.
Giulio Marchetti
Henry Norman Mellor
By John J. Halstead
their Atty's (No Model.) 5 Sheets—Sheet 2.
G. MARCHETTI & H. N. MELLOR.
METHOD OF AND MEANS FOR LUBRICATING THE WIRES IN LOOMS FOR WEAVING PILE FABRICS.
No. 483,073. Patented Sept. 20, 1892.
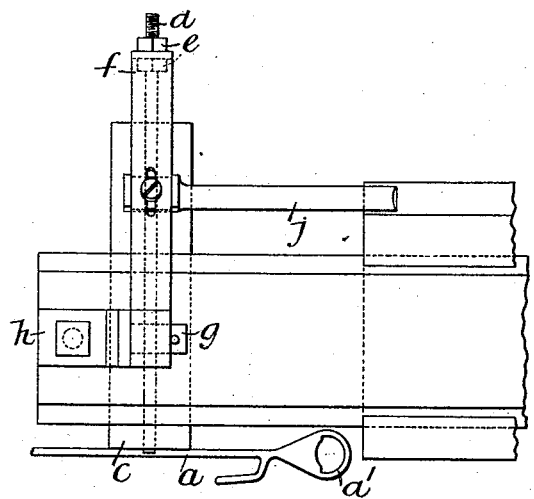
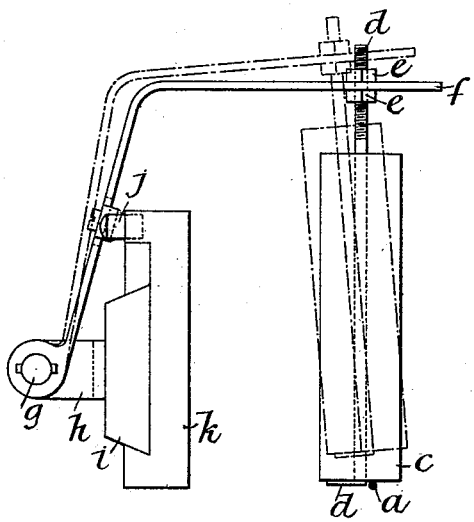
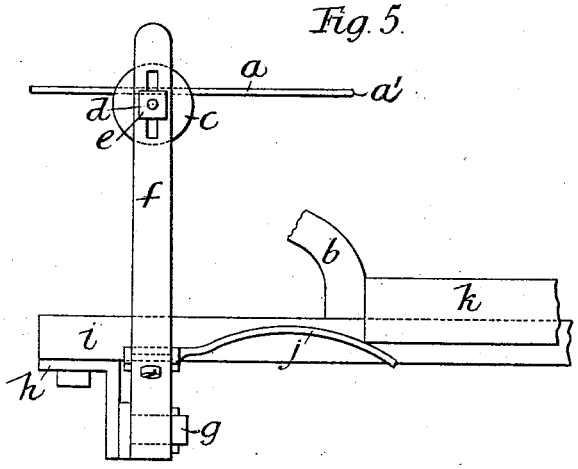

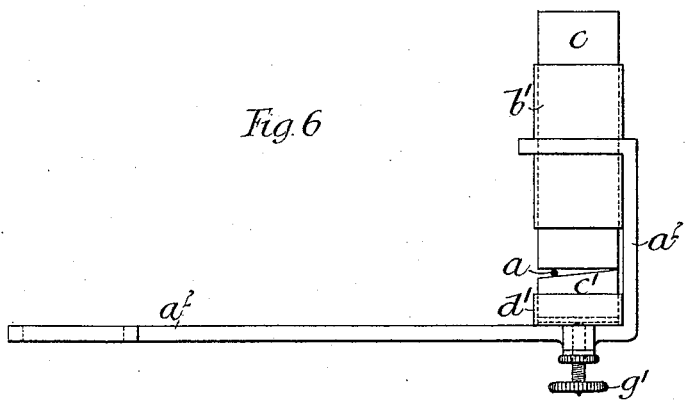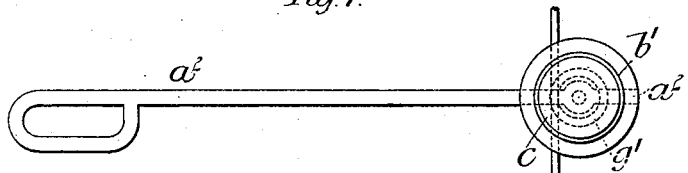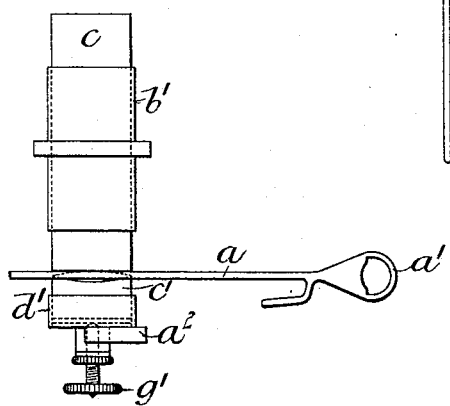

(No Model.) 5 Sheets—Sheet 4.
G. MARCHETTI & H. N. MELLOR.
METHOD OF AND MEANS FOR LUBRICATING THE WIRES IN
LOOMS FOR WEAVING PILE FABRICS.
No. 483,073. Patented Sept. 20, 1892.
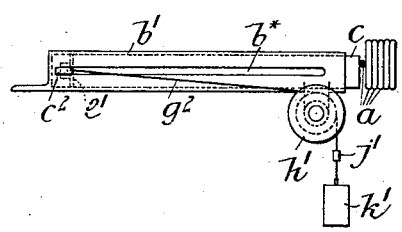
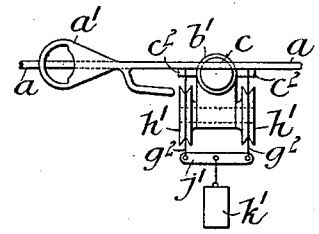
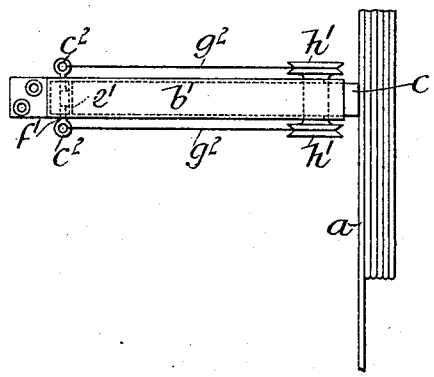
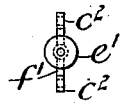
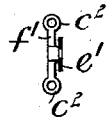

(No Model.) 5 Sheets—Sheet 5.
G. MARCHETTI & H. N. MELLOR.
METHOD OF AND MEANS FOR LUBRICATING THE WIRES IN LOOMS FOR WEAVING PILE FABRICS.
No. 483,073. Patented Sept. 20, 1892.
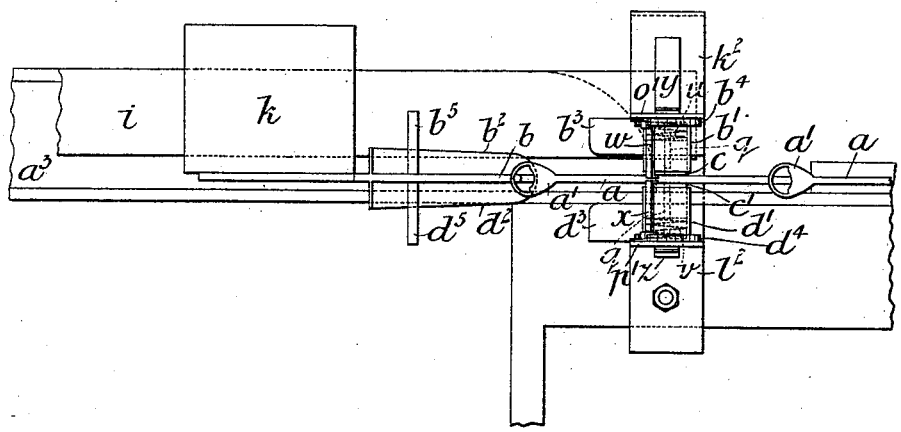
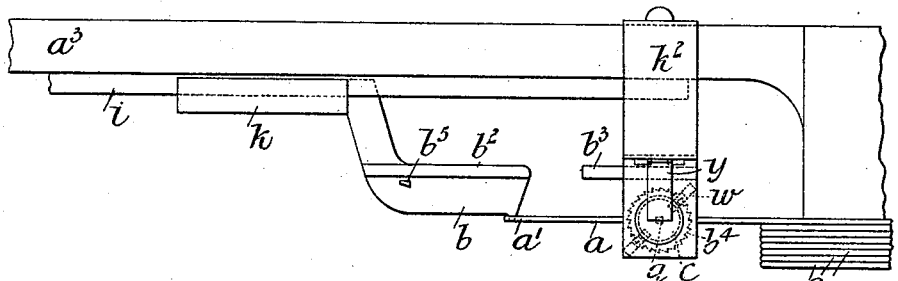
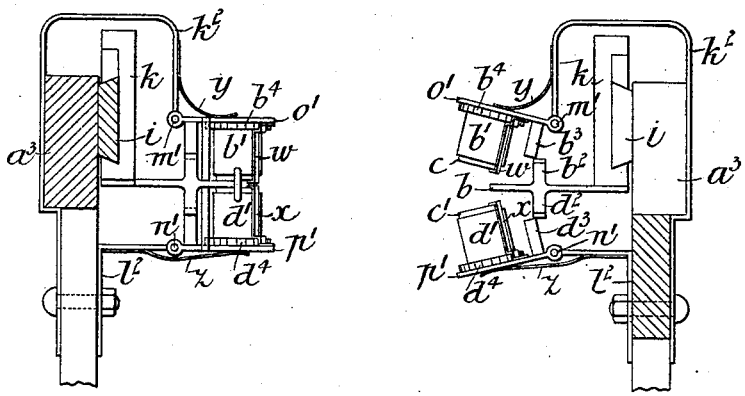

UNITED STATES PATENT OFFICE.

GIULIO MARCHETTI AND HENRY NORMAN MELLOR, OF HALIFAX, ENGLAND.

METHOD OF AND MEANS FOR LUBRICATING THE WIRES IN LOOMS FOR WEAVING PILE FABRICS.

SPECIFICATION forming part of Letters Patent No. 483,073, dated September 20, 1892.

Application filed September 3, 1890. Serial No. 363,807. (No model.) Patented in England April 3, 1890, No. 5,210; in France August 26, 1890, No. 207,876; in Germany August 30, 1890, No. 56,667, and in Austria-Hungary April 22, 1891, No. 54,682 and No. 9,445.

*To all whom it may concern:*

Be it known that we, GIULIO MARCHETTI and HENRY NORMAN MELLOR, subjects of the Queen of Great Britain, residing at Halifax, England, have invented a new and useful Improved Method and Means for Lubricating the Wires in Looms for Weaving Pile Fabrics, (patented in Great Britain by Letters Patent No. 5,210, dated April 3, 1890; in France by Letters Patent No. 207,876, dated August 26, 1890; in Germany by Letters Patent No. 56,667, dated August 30, 1890, and in Austria - Hungary by Letters Patent No. 54,682 and No. 9,445, dated April 22, 1891,) of which the following is a specification.

Our invention relates to improvements in the manufacture of carpets, rugs, and other looped or pile fabrics in which the loops or pile are or is formed by means of wires which are inserted in the shed and withdrawn from the fabric by mechanical means, and which wires require to be lubricated. In order to lubricate the wires, it has been customary during the withdrawal or insertion of the wires (or both) to pass them through a brush or brushes moistened or charged with oil from time to time. The wires during the passage through the brush or brushes take up portions of the oil held by the brush or brushes, and the oil thus taken up by the wires lubricates them and enables them to be more easily withdrawn from the fabric, reducing the friction upon the wires and preventing them from getting hot. Difficulties have been experienced in the use of oil as a lubricant, owing, among other causes, to its liquid character. As the brush or brushes is or are usually moistened or charged by hand, it has been found difficult to insure regularity in the quantity of oil which is applied to the brush or brushes from time to time, so that when too much oil has been applied to the brush or brushes too much oil has been taken up by the wires and transferred by them to the fabric to the detriment of the fabric, especially where the fabric is composed of light-colored material, the superfluous oil frequently impairing the color of and soiling the fabric and causing dust to adhere to it. It has also been found that immediately after the brush or brushes has or have been moistened or charged with oil a larger quantity of oil is taken up by the wires than at a later period, and that the quantity of oil taken up by the wires gradually decreases until the brush or brushes has or have been again moistened or charged with oil. Unless the wires take up a sufficient quantity of oil it becomes difficult to withdraw them from the fabric, and they become hot and the surface of the fabric is liable to injury thereby.

In place of the brush or brushes alluded to above "tufts" or "tassels" of worsted or other material are sometimes used.

Our invention has for its object the avoidance of the above objections, and for this purpose, instead of applying oil or like liquid lubricant to the wires, as hitherto, we make use of a suitable lubricant of a practically solid character or consistency, which we apply to the wires during their insertion or withdrawal (or both) by means of suitable mechanical contrivances, such as those hereinafter mentioned, being so constructed and arranged that a regular supply of the solid lubricant is applied to the wires, thereby reducing friction and rendering the withdrawal of the wires easy and avoiding risk of injury to the fabric.

In practice we have found that good results are obtained by using paraffine in a solid form.

In order to enable our invention to be fully understood, we have illustrated in the accompanying drawings arrangements of apparatus which we have found to answer well in practice for effecting the lubrication of the wires by applying a solid lubricant thereto.

We will first describe, by reference to Figures 1, 2, 3, 4, and 5, the arrangements for effecting the lubrication of the top of the wire as it is withdrawn from the fabric.

Figure 2:
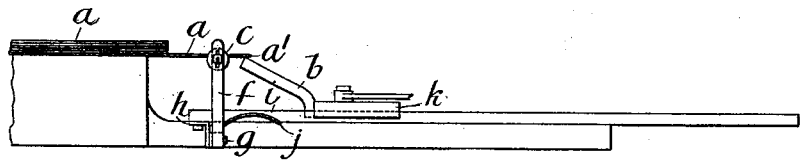

In the figures, Fig. 1 is a front view of a part of a loom with the apparatus applied thereto, and Fig. 2 is a plan of the same. Fig. 3 is a front view of part of the said loom and of the apparatus, drawn to a larger scale. Fig. 4 is an end view, and Fig. 5 is a plan, of Fig. 3; Figs. 6, 7, and 8, an arrangement for applying the lubricant during the insertion of the wires; Figs. 9, 10, 11, 11ª, and 11ᵇ, an arrangement for applying at the side of the wires as they are withdrawn; Figs. 12, 13, 14, and 15, arrangements for applying it at the top and bottom of the wire.

$a$ represents one of the wires employed to form the loop or pile of the fabric, $a'$ is the head of the said wire, and $b$ is the hook employed to withdraw the wires from the fabric, all the said parts being of the usual construction.

$c$ represents the solid lubricant, which we find it advantageous to employ in a cylindrical form, and which we hereinafter term the "lubricating-cylinder."

Through the center of the lubricating-cylinder $c$ is a hole sufficiently large to allow the said cylinder to revolve freely upon the stud or holder $d$. The lower portion of the stud $d$ is flattened and turned at right angles, so that the lubricating-cylinder is prevented from falling from the stud. The upper portion of the stud $d$ is provided with a screw-thread, upon which the regulating-nuts $e e$ are screwed, so that the stud $d$ can be raised and lowered at will.

$f$ is a bent lever pivoted on the center $g$, which center $g$ forms part of the bracket $h$, attached to the slide $i$. A curved arm $j$ is attached to the lever $f$.

The hook $b$ is attached to the slide-box $k$, which box slides on the slide $i$ and is operated in any well-known manner, such as by means of a link $l$, connected to the lever $m$, the said lever being pivoted at $p$ and connected to the revolving disk $o$ by the adjustable link $n$. When the slide-box $k$, carrying the hook $b$, is approaching the wires, it comes in contact with the curved arm $j$, and, pressing the said curved arm on one side as it advances, it causes the bent lever $f$ to rise and thereby raise the lubricating-cylinder $c$ until they both assume the position indicated by the dotted lines in Fig. 4. The stud $d$ and the lubricating-cylinder $c$ are thus moved out of the way and allow the hook $b$ to pass as it approaches the fabric, and the stud $d$ and lubricating-cylinder $c$ are maintained in this position until the box $k$ is withdrawn sufficiently far from the fabric to release the curved arm $j$, by which time the hook $b$ and the wire head $a'$ have passed the lubricating-cylinder $c$. When the curved arm $j$ is released, the stud $d$ descends until the bottom of the lubricating-cylinder $c$ comes in contact with the top of the wire $a$, and as the said wire is withdrawn from the fabric the top of it is lubricated by its contact with the lubricating-cylinder $c$, which is caused to revolve by the friction of the wire $a$ as the wire is withdrawn from the fabric. This revolving motion of the lubricating-cylinder $c$ assists the lubrication of the wire and effects economy in consumption of the lubricant by causing the lubricating-cylinder to wear evenly away instead of wearing into grooves.

As the bottom of the lubricating-cylinder is worn away by the action of the wire the said cylinder gradually descends upon the stud $d$, so as to give a regular supply of the solid lubricant to the wires.

We have hitherto spoken of our lubricating-cylinder as though it were in one piece. In some cases, however, we find it convenient to build it up of rings, so that as one of these rings is worn away by the action of the wires another ring can be placed on the stud $d$, thus preventing any serious variation in the weight of the lubricating-cylinder and insuring a regular supply of the solid lubricant to the wires.

In practice we have found that the above-described method of using a solid lubricant gives very satisfactory results; but it will be obvious that it may be applied both to the top and to the bottom of the wires and also to the sides thereof, and that the solid lubricant, instead of being applied during the withdrawal of the wires, may be applied during their insertion or during both their withdrawal and insertion. We will therefore proceed to describe suitable arrangements for applying the lubricant to the wires in the said several ways.

Fig. 6 is a side elevation, Fig. 7 is a plan view, and Fig. 8 is an end elevation, of an arrangement for applying solid lubricant to the wires during their insertion into the fabric. In these figures, $a^2$ is a support secured by suitable means to the framing of the loom and carrying a tube or holder $b'$. The lubricating-cylinder is in this arrangement formed in two separate parts $c$ and $c'$, the upper part $c$ moving freely in the tube $b'$, while the lower part $c'$ is carried by a circular box $d'$ on the support $a^2$. The box $d'$ is provided with a false bottom, which can be raised, as required, by means of the regulating-screw $g'$, thus raising the portion of the solid lubricant $c'$, as required. $a$ represents one of the wires.

When a wire has been withdrawn from the fabric, its point is carried over by the carrier in the well-known manner until the portion of the wire adjoining the point is inserted between the two portions $c$ and $c'$ of solid lubricant, and the wire during its insertion passes for the greater part of its length between these two portions of solid lubricant.

Fig. 9 is a side elevation of an arrangement for applying the solid lubricant to one side of the wires during their withdrawal from the fabric, and Fig. 10 is a plan view, and Fig. 11 is an end view, of the same arrangement. Figs. 11ª and 11ᵇ are views of a detail.

$b'$ is a slotted tube or holder suitably fixed in the loom in such a position that one end of it is opposite one end of the wire $a$ nearest to the front of the loom. $c$ is the lubricating-cylinder sliding freely in the tube $b'$. $c^2 c^2$ are ring-shaped ends or eyes of a bar $f'$. (Shown detached at Figs. 11ª and 11ᵇ.) On a pin fixed to the said bar is a disk $e'$, which disk can revolve and slide freely in the tube $b'$ as the bar $f'$ slides in the slots $b^* b^*$ in the sides of the tube $b'$. To the eyes $c^2 c^2$ of the bar $f'$ are attached cords $g^2 g^2$, which pass over pulleys $h' h'$, suitably fixed to the loom and attached to a rod $j'$, carrying a weight $k'$. The weight $k'$ causes the disk $e'$ to press against one end of the lubricating-cylinder $c$, and as the said cylinder slides freely in the tube $b'$ the other end is pressed against one side of one of the wires $a$ until this wire is withdrawn. On the withdrawal of the wire the lubricating-cylinder $c$ is pressed against the next wire until that is withdrawn, so that the lubricating-cylinder is pressed against one side of each wire in turn during its withdrawal.

Fig. 12 is an end elevation showing an arrangement for applying solid lubricant to the top and bottom of the wires during their withdrawal from the fabric. Fig. 13 is an elevation of the same, looking from the back of the loom. Fig. 14 is a plan view, and Fig. 15 is an elevation, of the same, looking from the interior of the loom, and in this figure some of the parts are shown in a different position to that indicated in Figs. 12, 13, and 14. $a^3$ is a rail of the loom. $i$ is the wire motion-slide. $k$ is the slide-box carrying the hook $b$, upon which hook are two swells $b^2$ and $d^2$, which swells come in contact with projections $b^3$ and $d^3$, respectively, when the hook $b$ approaches the wire heads $a' a'$. $k^2$ and $l^2$ are brackets secured to the rail $a^3$ and connected at their extremities by the hinges $m'$ and $n'$ to plates $o'$ and $p'$, respectively. The said plates carry projections $b^3$ and $d^3$. In a circular hole in each of these plates revolve boxes $b'$ and $d'$, which carry the lubricating-cylinders $c$ and $c'$, and to the bottoms of the said boxes are secured square pegs $q\ q$, (indicated by dotted lines,) which square pegs pass through corresponding square holes through the centers of the lubricating-cylinders $c$ and $c'$. Upon these pegs the lubricating-cylinders $c$ and $c'$ can work freely up and down. $u$ and $v$ are spiral springs, which always keep the lubricating-cylinders pressed against the bent extremities of the guards $w$ and $x$, which are bent for the purpose of preventing the said lubricating-cylinders from being pushed too far from the boxes by the said spiral springs. The square pegs $q\ q$, engaging in the square holes of the lubricating-cylinders $c$ and $c'$, cause the said cylinders to revolve with the boxes $b'$ and $d'$, which are held in their proper positions by springs $y$ and $z$. The hook $b$ is actuated by any of the well-known methods, and on approaching the wire heads $a'\ a'$ the swells $b^2$ and $d^2$ come in contact with the projections $b^3$ and $d^3$, respectively, and force the two plates $o'$ and $p'$, carrying the boxes $b'\ d'$, apart, as shown in Fig. 15, and keep them apart until the hook $b$ and the wire head $a'$, hooked to it, have passed between them, when the plates $o'$ and $p'$ are released and the lubricating-cylinders $c$ and $c'$ resume their position, and coming in contact with the top and bottom of the wire $a$ lubricate it throughout the greater part of its length.

The guards $w$ and $x$ are secured to the plates $o'$ and $p'$ and are arranged on each side of the course of the wire $a$ so as not to come in contact with it. At their opposite extremities from the plates $o'$ and $p'$ the said guards are bent at right angles, so as to prevent the lubricating-cylinders from being forced too far out of the boxes $b'$ and $d'$. In order to cause the lubricating-cylinders to revolve, and thereby insure a regular supply of the solid lubricant, the boxes $b'$ and $d'$ are provided with ratchet-wheels $b^4\ d^4$, respectively. Upon the hook $b$ are two pins $b^5\ d^5$, which pins are in such a position that every time the hook $b$ approaches the fabric to withdraw a wire the said pins come in contact with the said ratchet-wheels and partly revolve them, and thereby the lubricating-cylinders $c$ and $c'$ thus presenting from time to time a different part of the surface of the said lubricating-cylinders to the action of the wires $a\ a$. The ratchet-wheels $b^4\ d^4$ prevent the boxes $b'\ d'$ from passing too far through the circular holes in the plates $o'\ p'$, and the guards $w$ and $x$ allow the said ratchet-wheels and the said boxes to revolve freely, but are bent so as to keep the ratchet-wheels against the plates $o'$ and $p'$, thereby preventing the boxes $b'\ d'$ from being displaced from the said plates.

It is obvious that the lubricating mechanism hereinbefore described may be readily adapted so as to enable a solid lubricant to be applied to the wires both while they are being inserted and during their withdrawal again, as above indicated. A solid lubricant may be applied above or below or on one or both sides of the wires.

By the term "tangential contact" as used in this application we mean a touching contact between the wire and the solid lubricant, be the parts circular in form or otherwise.

Having now particularly described and ascertained the nature of our said invention and in what manner the same is to be performed, we declare that what we claim is—

1. The process of lubricating the pile-wires in a pile-fabric loom, which consists in placing a solid lubricant in tangential contact with said wires and then moving the wires longitudinally, whereby they are lubricated in substantially a longitudinal line only, as specified.

2. The process of lubricating the pile-wires in a pile-fabric loom, consisting in placing a solid lubricant in tangential contact with said wires, then moving said wires longitudinally, and revolving such lubricant during the insertion or withdrawal of the wires, and whereby the wires shall be lubricated in substantially a longitudinal line only, as specified.

3. In combination with the pile-wire and means for operating the same, a support for a lubricant, provided with a holder, for positively retaining a solid lubricant in surface contact with said wire, substantially as described.

4. In combination with the pile-wire and means for operating the same, a lubricant-support provided with a holder for positively retaining a solid lubricant in surface contact with said wire, and means for revolving said holder, substantially as described.

5. In combination with the pile-wire and means for operating the same, a lubricant-support provided with a holder for positively retaining a solid lubricant in surface contact with said wire, and a ratchet-wheel and means for rotating the same serving to revolve said holder and its lubricant, substantially as set forth.

GIULIO MARCHETTI.
    HENRY NORMAN MELLOR.

Witnesses:
 WM. SUNDERLAND,
  *Clover Hill, Halifax.*
 WM. ALEXR. PATTERSON,
  17 *Gladstone Road, Halifax.*